United States Patent
Arana (10) Patent No.: US 12,374,013 B2
(45) Date of Patent: Jul. 29, 2025

(54) DISTRIBUTION OF SIGN LANGUAGE ENHANCED CONTENT

(71) Applicant: Disney Enterprises, Inc., Burbank, CA (US)

(72) Inventor: Mark Arana, Agoura Hills, CA (US)

(73) Assignee: Disney Enterprises, Inc., Burbank, CA (US)

(*) Notice: Subject to any disclaimer, the term of this patent is extended or adjusted under 35 U.S.C. 154(b) by 0 days.

(21) Appl. No.: 17/735,907

(22) Filed: May 3, 2022

(65) Prior Publication Data
US 2022/0358854 A1 Nov. 10, 2022

Related U.S. Application Data

(60) Provisional application No. 63/184,692, filed on May 5, 2021.

(51) Int. Cl.
*G06T 13/00* (2011.01)
*G06F 3/14* (2006.01)
(Continued)

(52) U.S. Cl.
CPC ............ *G06T 13/00* (2013.01); *G06F 3/1423* (2013.01); *G06F 40/20* (2020.01); *G06F 40/58* (2020.01);
(Continued)

(58) Field of Classification Search
CPC ......... G06T 13/00; G06T 11/00; G06F 40/20; G06F 40/58; G06F 3/14; G06F 3/1423;
(Continued)

(56) References Cited

U.S. PATENT DOCUMENTS 6,327,272 B1   12/2001   Van Steenbrugge
6,483,532 B1   11/2002   Girod
(Continued)

FOREIGN PATENT DOCUMENTS

WO   2018052901   3/2018
WO   2019157344   8/2019

OTHER PUBLICATIONS

Tiago Maritan U. de Araujo, Felipe L.S. Ferreira, Danilo A.N.S. Silva, Leonardo D. Oliveira, Eduardo L. Falcao, Leonardo A. Domingues, Vandhuy F. Martins, Igor A.C. Portela, Yurika S. Nobrega, Hozana R.G. Lima, Guido L. Souza Filho, Tatiana A. Tavares, Alexandra N. Duarte "An Approach to Generate and Embed Sign Language Video Tracks Into Multimedia Contents" Information Sciences vol. 281, Oct. 10, 2014 7 Pgs.
(Continued)

*Primary Examiner* — Timothy A Musselman
(74) *Attorney, Agent, or Firm* — Farjami & Farjami LLP (57) ABSTRACT

A system for distributing sign language enhanced content includes a computing platform having processing hardware and a system memory storing a software code. The processing hardware is configured to execute the software code to receive content including at least one of a sequence of audio frames or a sequence of video frames, perform an analysis of the content, and identify, based on the analysis, a message conveyed by the content. The processing hardware is further configured to execute the software code to generate a sign language translation of the content, the sign language translation including one or more of a gesture, body language, or a facial expression communicating the message conveyed by the content.

16 Claims, 7 Drawing Sheets

(51) Int. Cl.
G06F 40/20 (2020.01)
G06F 40/58 (2020.01)
G06T 11/00 (2006.01)
G06V 20/40 (2022.01)
G09B 21/00 (2006.01)
G10L 15/22 (2006.01)
G10L 21/055 (2013.01)
G10L 25/57 (2013.01)
G10L 25/63 (2013.01)
H04N 21/242 (2011.01)
H04N 21/488 (2011.01)

(52) U.S. Cl.
CPC .............. *G06T 11/00* (2013.01); *G06V 20/40* (2022.01); *G06V 20/41* (2022.01); *G09B 21/009* (2013.01); *G10L 15/22* (2013.01); *G10L 21/055* (2013.01); *G10L 25/57* (2013.01); *G10L 25/63* (2013.01); *H04N 21/242* (2013.01); *H04N 21/488* (2013.01)

(58) Field of Classification Search
CPC ...... G06V 20/40; G06V 20/41; G09B 21/009; G10L 15/22; G10L 21/05; G10L 21/055; G10L 25/57; G10L 25/63; H04N 21/242; H04N 21/488
See application file for complete search history.

(56) References Cited

U.S. PATENT DOCUMENTS

| | | | |
|---|---|---|---|
| 6,545,685 | B1 | 4/2003 | Dorbie |
| 7,827,547 | B1 | 11/2010 | Sutherland et al. |
| 7,827,574 | B1 | 11/2010 | Hendricks et al. |
| 8,566,075 | B1 | 10/2013 | Bruner |
| 9,215,514 | B1 | 12/2015 | Kline |
| 10,375,237 | B1 | 8/2019 | Williams et al. |
| 10,514,766 | B2 | 12/2019 | Gates et al. |
| 10,735,213 | B2* | 8/2020 | Nakahara ........... H04N 21/6543 |
| 2002/0104083 | A1 | 8/2002 | Hendricks et al. |
| 2005/0097593 | A1 | 5/2005 | Raley et al. |
| 2006/0018254 | A1 | 1/2006 | Sanders |
| 2009/0141793 | A1 | 6/2009 | Gramelspacher et al. |
| 2009/0262238 | A1 | 10/2009 | Hope et al. |
| 2010/0254408 | A1 | 10/2010 | Kuno |
| 2011/0096232 | A1 | 4/2011 | Dewa et al. |
| 2011/0157472 | A1 | 6/2011 | Keskinen |
| 2011/0162021 | A1 | 6/2011 | Lee |
| 2013/0141551 | A1 | 6/2013 | Kim |
| 2014/0046661 | A1 | 2/2014 | Bruner |
| 2014/0242955 | A1* | 8/2014 | Kang ...................... G06F 40/58 455/414.1 |
| 2015/0163545 | A1 | 6/2015 | Freed et al. |
| 2015/0317307 | A1 | 11/2015 | Mahkovec et al. |
| 2015/0350139 | A1 | 12/2015 | Speer et al. |
| 2016/0098850 | A1 | 4/2016 | Shintani et al. |
| 2016/0191958 | A1 | 6/2016 | Nauseef et al. |
| 2016/0198214 | A1* | 7/2016 | Levy ................ H04N 21/64322 725/43 |
| 2016/0294714 | A1 | 10/2016 | Persson et al. |
| 2017/0006248 | A1 | 1/2017 | An et al. |
| 2017/0111670 | A1 | 4/2017 | Ducloux et al. |
| 2017/0132828 | A1 | 5/2017 | Zelenin et al. |
| 2018/0063325 | A1 | 3/2018 | Wilcox et al. |
| 2018/0075659 | A1 | 3/2018 | Browy et al. |
| 2019/0052473 | A1 | 2/2019 | Soni et al. |
| 2019/0096407 | A1* | 3/2019 | Lambourne ............ G11B 27/10 |
| 2019/0213401 | A1 | 7/2019 | Kuang |
| 2019/0251344 | A1 | 8/2019 | Menefee |
| 2020/0294525 | A1 | 9/2020 | Santos et al. |
| 2021/0241309 | A1 | 8/2021 | Wolf, Jr. |
| 2021/0352380 | A1 | 11/2021 | Duncan et al. |
| 2022/0141547 | A1 | 5/2022 | Plunkett, Jr. |
| 2022/0171960 | A1 | 6/2022 | Nelson et al. |
| 2022/0327309 | A1 | 10/2022 | Carlock et al. |
| 2022/0335971 | A1* | 10/2022 | Gruszka .................. G06F 3/017 |
| 2022/0343576 | A1 | 10/2022 | Marey et al. |

OTHER PUBLICATIONS

International Search Report and Written opinion dated Jul. 13, 2022 for International Application PCT/US2022/027716.
International Search Report and Written opinion dated Jul. 15, 2022 for International Application PCT/US2022/027717.
International Search Report and Written opinion dated Jul. 15, 2022 for International Application PCT/US2022/027719.
International Search Report and Written opinion dated Aug. 9, 2022 for International Application PCT/US2022/027713.
"Guidelines for Positioning of Sign Language Interpreters in Conferences, Including Web-Streaming: Proper spatial organization enhances communication when SLI is used in meetings. These simple steps will help you realize your goals." Sign Language Network.
"Guidelines for positioning of sign language interpreters in conferences, including web-streaming" Sign Language Network. Dec. 21, 2016. pp. 1-6.
"Sign Language, Video Encoding for Digital Cinema" ISDCF Document 13. Jul. 18, 2018 pp. 1-6.
International Search Report and Written Opinion for International Application PCT/US2022/027717 dated Jul. 15, 2022.
International Search Report & Written Opinion for International Application PCT/US2022/025123, dated Jul. 4, 2022.
File History of U.S. Appl. No. 17/735,926, filed May 3, 2022.
ISDCF Doc4-16-Channel Audio Packaging Guide obtained from https://files.isdcf.com/papers/ISDCF-Doc4-Audio-channel-recommendations.pdf (2017).
File History of U.S. Appl. No. 17/735,920, filed May 3, 2022.
File History of U.S. Appl. No. 17/735,935, filed May 3, 2022.
File History of U.S. Appl. No. 17/506,054, filed Oct. 20, 2021.
Published Dec. 21, 2016. Last updated: Dec. 12, 2016. 6 pgs.
ISDCF: "Sign Language Video Encoding for Digital Cinema" Jul. 18, 2018 pp. 1-6.
Daniel Jones "Demystifying Audio Watermarking, Fingerprinting and Modulation." Published Jan. 19, 2017. 10 pgs.

* cited by examiner

DISTRIBUTION OF SIGN LANGUAGE ENHANCED CONTENT

RELATED APPLICATIONS

The present application claims the benefit of and priority to a Provisional Patent Application Ser. No. 63/184,692, filed on May 5, 2021, and titled "Distribution of Sign Language Enhanced Content," which is hereby incorporated fully by reference into the present application. The present application is also related to U.S. patent application Ser. No. 17/735,920, titled "Accessibility Enhanced Content Creation," U.S. patent application Ser. No. 17/735,926, titled "Accessibility Enhanced Content Delivery," and U.S. patent application Ser. No. 17/735,936, titled "Accessibility Enhanced Content Rendering," all filed concurrently with the present application, and all are hereby incorporated fully by reference into the present application.

BACKGROUND

Members of the deaf and hearing impaired communities often rely on any of a number of signed languages for communication via hand signals. Although effective in translating the plain meaning of a communication, hand signals alone typically do not fully capture the emphasis or emotional intensity motivating that communication. Accordingly, skilled human sign language translators tend to employ multiple physical modes when communicating information. Those modes may include gestures other than hand signals, postures, and facial expressions, as well as the speed and force with which such expressive movements are executed.

For a human sign language translator, identification of the appropriate emotional intensity and emphasis to include in a signing performance may be largely intuitive, based on cognitive skills honed unconsciously as the understanding of spoken language is learned and refined through childhood and beyond. However, the exclusive reliance on a sign language translation can be expensive, and in some use cases may be inconvenient or even impracticable. Consequently, there is a need in the art for an automated solution for providing sign language enhancement of content.

DETAILED DESCRIPTION

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses systems and methods for providing feelings-based or emotion-based sign language enhancement of content. It is noted that although the present content enhancement solution is described below in detail by reference to the exemplary use case in which feelings-based or emotion-based sign language is used to enhance audio-video (A/V) content having both audio and video components, the present novel and inventive principles may be advantageously applied to video unaccompanied by audio, as well as to audio content unaccompanied by video. In addition, or alternatively, in some implementations, the type of content that is sign language enhanced according to the present novel and inventive principles may be or include digital representations of persons, fictional characters, locations, objects, and identifiers such as brands and logos, for example, which populate a virtual reality (VR), augmented reality (AR), or mixed reality (MR) environment. Moreover, that content may depict virtual worlds that can be experienced by any number of users synchronously and persistently, while providing continuity of data such as personal identity, user history, entitlements, possessions, payments, and the like. It is noted that the content enhancement solution disclosed by the present application may also be applied to content that is a hybrid of traditional audio-video and fully immersive VR/AR/MR experiences, such as interactive video.

It is further noted that, as defined in the present application, the expression "sign language" refers to any of a number of signed languages relied upon by the deaf community and other hearing impaired persons for communication via hand signals, facial expressions, and in some cases body language such as motions or postures. Examples of sign languages within the meaning of the present application include sign languages classified as belonging to the American Sign Language (ASL) cluster, Brazilian sign Language (LIBRAS), the French Sign Language family, Indo-Pakistani Sign Language, Chinese Sign Language, the Japanese Sign Language family, and the British, Australian, and New Zealand Sign Language (BANZSL) family, to name a few.

It is also noted that although the present content enhancement solution is described below in detail by reference to the exemplary use case in which feelings-based or emotion-based sign language is used to enhance content, the present novel and inventive principles may also be applied to content enhancement through the use of an entire suite of accessibility enhancements. Examples of such accessibility enhancements include assisted audio, forced narratives, subtitles, and captioning, to name a few. Moreover, in some implementations, the systems and methods disclosed by the present application may be substantially or fully automated.

As used in the present application, the terms "automation," "automated," and "automating" refer to systems and processes that do not require the participation of a human analyst or editor. Although, in some implementations, a human system administrator may sample or otherwise review the sign language enhanced content distributed by the automated systems and according to the automated methods described herein, that human involvement is optional. Thus, the methods described in the present application may be performed under the control of hardware processing components of the disclosed automated systems.

It is also noted that, as defined in the present application, the expression "machine learning model" may refer to a mathematical model for making future predictions based on patterns learned from samples of data or "training data." Various learning algorithms can be used to map correlations between input data and output data. These correlations form the mathematical model that can be used to make future predictions on new input data. Such a predictive model may include one or more logistic regression models, Bayesian models, or artificial neural networks (NNs). A "deep neural network," in the context of deep learning, may refer to an NN that utilizes multiple hidden layers between input and output layers, which may allow for learning based on features not explicitly defined in raw data. As used in the present application, a feature identified as an NN refers to a deep neural network.

Figure 1:
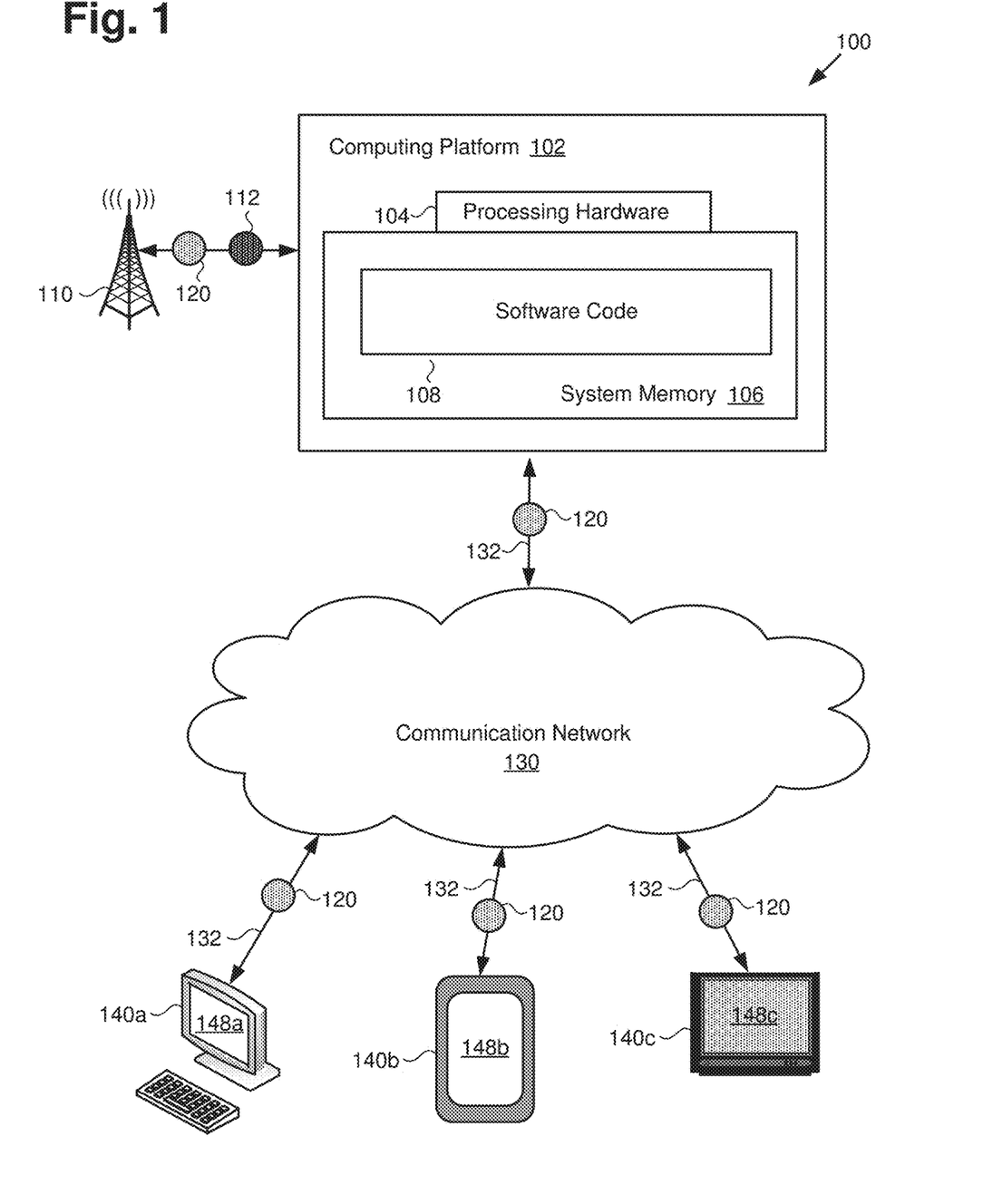
FIG. 1 shows a diagram of an exemplary system for distributing sign language enhanced content, according to one implementation.

FIG. 1 shows exemplary system 100 for distributing sign language enhanced content, according to one implementation. As shown in FIG. 1, system 100 includes computing platform 102 having processing hardware 104 and system memory 106 implemented as a computer-readable nor-transitory storage medium. According to the present exemplary implementation, system memory 106 stores software code 108 which may include one or more machine learning models.

As further shown in FIG. 1, system 100 is implemented within a use environment including content broadcast source 110 providing content 112 to system 100 and receiving sign language enhanced content 120 corresponding to content 112 from system 100. As depicted in FIG. 1, in some use cases, content broadcast source 110 may find it advantageous or desirable to make content 112 available via an alternative distribution Channel such as communication network 130, which may take the form of a packet-switched network, for example, such as the Internet. For instance, system 100 may be utilized by content broadcast source 110 to distribute sign language enhanced content 120 including content 112 as part of a content stream, which may be an Internet Protocol (IP) content stream provided by a streaming service, or a video-on-demand (VOD) service.

The use environment of system 100 also includes user systems 140a, 140b, and 140c (hereinafter "user systems 140a-140c") receiving sign language enhanced content 120 from system 100 via communication network 130. Also shown in FIG. 1 are network communication links 132 of communication network. 130 interactively connecting system. 100 with user systems 140a-140c, as well as displays 148a, 148b, and 148c (hereinafter "displays 148a-148c") of respective user systems 140a-140c, As discussed in greater detail below, sign language enhanced content 120 includes content 112 as well as imagery depicting a performance of a sign language translation of content 112 for rendering on one or more of displays 148a-148c.

Although the present application refers to software code 108 as being stored in system memory 106 for conceptual clarity, more generally, system memory 106 may take the form of any computer-readable non-transitory storage medium. The expression "computer-readable non-transitory storage medium," as used in the present application, refers to any medium, excluding a carrier wave or other transitory signal that provides instructions to processing hardware 104 of computing platform 102 or to respective processing hardware of user systems 140a-140c. Thus, a computer-readable non-transitory storage medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory storage media include, for example, optical discs such as DVDs, RAM, programmable read-only Memory (PROM), erasable PROM (EPROM), and FLASH memory.

Processing hardware 104 may include multiple hardware processing units, such as one or more central processing units, one or more graphics processing units, and one or more tensor processing units, one or more field-programmable gate arrays (FPGAs), custom hardware for machine-learning training or inferencing, and an application programming interface (API) server, for example. By way of definition, as used in the present application, the terms "central processing unit" (CPU), "graphics processing unit" (GPU), and "tensor processing unit" (TPU) have their customary meaning in the art. That is to say, a CPU includes an Arithmetic Logic Unit (ALU) for carrying out the arithmetic and logical operations of computing platform 102, as well as a Control Unit (CU) for retrieving programs, such as software code 108, from system memory 106, while a GPU may be implemented to reduce the processing overhead of the CPU by performing computationally intensive graphics or other processing tasks. A TPU is an application-specific integrated circuit (ASIC) configured specifically for artificial intelligence (AI) processes such as machine learning.

Although FIG. 1 depicts single computing platform 102, system 100 may include one or more computing platforms corresponding to computing platform 102, such as computer servers for example, which may be co-located, or may form an interactively linked but distributed system, such as a cloud based system, for instance. As a result, processing hardware 104 and system memory 106 may correspond to distributed processor and memory resources within system 100. In one such implementation, computing platform 102 may correspond to one or more web servers accessible over a packet-switched network such as the Internet, for example. Alternatively, computing platform 102 may correspond to one or more computer servers supporting a wide area network (WAN), a local area network (LAN), or included in another type of private or limited distribution network.

In addition, or alternatively, in some implementations, system 100 may utilize a local area broadcast method, such as User Datagram Protocol (UDP) or Bluetooth, for example. Furthermore, in some implementations, system 100 may be implemented virtually, such as m a data center. For example, in some implementations, system 100 may be implemented in software or as virtual machines.

It is further noted that, although user systems 140a-140c are shown variously as desktop computer 140a, smartphone 140b, and smart television (smart TV) 140c, in FIG. 1, those representations are provided merely by way of example. In other implementations, user systems 140a-140c may take the form of any suitable mobile or stationary computing devices or systems that implement data processing capabilities sufficient to provide a user interface, support connections to communication network 130, and implement the functionality ascribed to user systems 140*a*-140*c* herein. That is to say', in other implementations, one or more of user systems 140*a*-140*c* may take the form of a laptop computer, tablet computer, digital media player, game console, or a wearable communication device such as a smartwatch, augmented reality (AR) viewer, or virtual reality (VR) headset, to name a few examples. It is also noted that displays 148*a*-148*c* may take the form of liquid crystal displays (LCDs), light-emitting diode (LED) displays, organic light-emitting diode (OLED) displays, quantum dot (Q)) displays, or any other suitable display screens that perform a physical transformation of signals to light.

In one implementation, content broadcast source 110 may be a media entity providing content 112. Content 112 may include content from a linear TV program stream, for example, that includes a high-definition (HD) or ultra-HD (UHD) baseband video signal with embedded audio, captions, time code, and other ancillary metadata, such as ratings and/or parental guidelines. In some implementations, content 112 may also include multiple audio tracks, and may utilize secondary audio programming (SAP) and/or Descriptive Video Service (DVS), for example. Alternatively, in some implementations, content 112 may be video game content. As yet another alternative, and as noted above, in some implementations content 112 may be or include digital representations of persons, fictional characters, locations, objects, and identifiers such as brands and logos, for example, which populate a VR, AR, or MR environment. Moreover and as further noted above, in some implementations content 112 may depict virtual worlds that can be experienced by any number of users synchronously and persistently, while providing continuity of data such as personal identity, user history, entitlements, possessions, payments, and the like. As also noted above, content 112 may be or include content that is a hybrid of traditional audio-video and fully immersive VR/AR/MR experiences, such as interactive video.

In some implementations, content 112 may be the same source video that is broadcast to a traditional TV audience. Thus, content broadcast source 110 may take the form of a conventional cable and/or satellite TV network, for example. As noted above, content broadcast source 110 may find it advantageous or desirable to make content 112 available via alternative distribution channel, such as communication network 130, which may take the form of a packet-switched network, for example, such as the Internet, as also noted above, Alternatively, or addition although not depicted in FIG. 1, in some use cases sign language enhanced content 120 may be distributed on a physical medium, such as a DVD, Blu-ray Disc®, or FLASH drive, for example.

Figure 2:
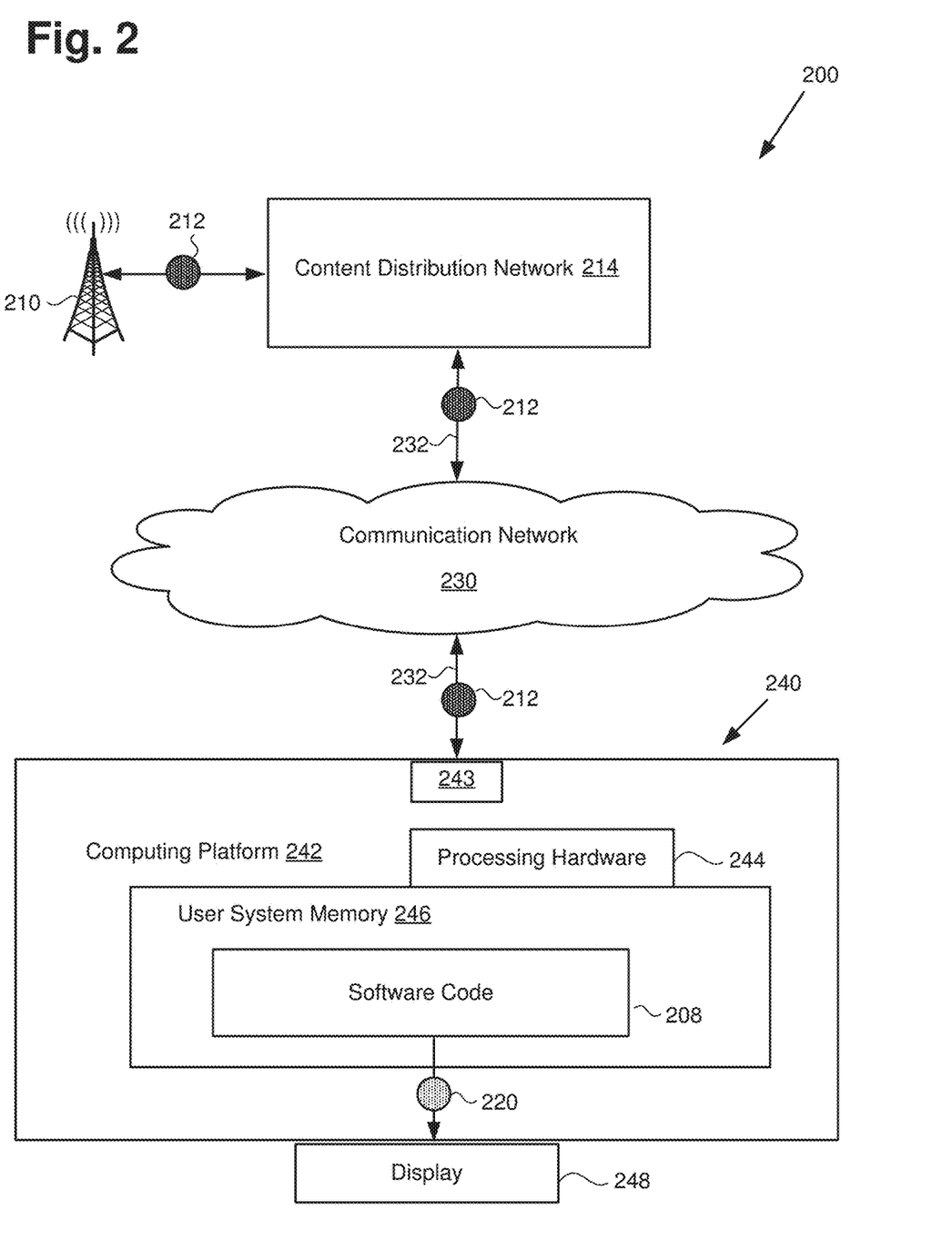
FIG. 2 shows a diagram of another exemplary implementation of a system for distributing sign language enhanced content, according to one implementation.

FIG. 2 shows another exemplary system, i.e., user system 240, for use in distributing sign language enhanced content, according to one implementation. As shown in FIG. 2, user system 240 includes computing platform 242 having transceiver 243, processing hardware 244, user system memory 246 implemented as a computer-readable non-transitory storage medium storing software code 208 and display 248. It is noted that, in various implementations, display 248 may be physically integrated with user system 240 or may be communicatively coupled to but physically separate from user system 240. For example, where user system 240 is implemented as a smart TV, smartphone, laptop computer, tablet computer, AR viewer, or VR headset, display 240 will typically be integrated with user system 240. By contrast, where user system 240 is implemented as a desktop computer, display 240 relay take the form of a monitor separate from computing platform 242 in the form of a computer tower.

As further shown in FIG. 2 user system 240 is utilized in use environment 200 including content broadcast source 210 providing content 212 to content distribution network 214, which in turn distributes content 212 to user system 240 via communication network 230 and network communication links 232. According to the implementation shown in FIG. 2, software code 208 stored in user system memory 246 of user system 240 is configured to receive content 212 and to output sign language enhanced content 220 including content 212 for rendering on display 248.

Content broadcast source 210, content 212, sign language enhanced content 220, communication network 230, and network communication links 232 correspond respectively in general to content broadcast source 110, content 112, sign language enhanced content 120, communication network 130, and network communication links 132, in FIG. 1. In other words, content broadcast source 210, content 212, sign language enhanced content 220, communication network 230, and network communication links 232 may share any of the characteristics attributed to respective content broadcast source 110, content 112, sign language enhanced content 120, communication network 130, and network communication links 132 by the present disclosure, and vice versa.

User system 240 and display 248 correspond respectively in general to any or all of user systems 140*a*-140*c* and respective displays 148*a*-148*c* in FIG. 1. Thus, user systems 140*a*-140*c* and displays 148*a*-148*c* may share any of the characteristics attributed to 115 respective user system 240 and display 248 by the present disclosure, and vice versa. That is to say, like displays 148*a*-148*c*, display 248 may take the form of an LCD, LED display, OED display, or QD display, for example. Moreover, although not shown in FIG. 1, each of user systems 140*a*-1.40*c* may include features corresponding respectively to computing platform 242, transceiver 243, processing hardware. 244, and user system memory 246 storing software code 208.

Transceiver 243 may be implemented as a wireless communication unit configured for use with one or more of a variety of wireless communication protocols. For example, transceiver 243 may be implemented as a fourth generation (4G) wireless transceiver, or as a 5G wireless transceiver. In addition, or alternatively, transceiver 243 may be configured for communications using one or more of WiFi, Bluetooth, Bluetooth LE, ZigBee, and 60 GHz wireless communications methods.

User system processing hardware 244 may include multiple hardware processing units, such as one or more CPUs, one or more GPUs, one or more TPUs, and one or more FPGAs, for example, as those features are defined above.

Software code 208 corresponds in general to software code 108, in FIG. 1, and is capable of performing all of the operations attributed software code 108 by the present disclosure. In other words, in implementations in which client processing hardware 244 executes software code 208 stored locally in user system memory 246, user system 240 may perform any of the actions attributed to system 100 by the present disclosure. Thus, in some implementations, software code 208 executed by processing hardware 244 of user system 240 may receive content 212 and may output sign language enhanced content 220 including content 212 as well as a performance of a sign language translation of content 212.

Figure 3A:
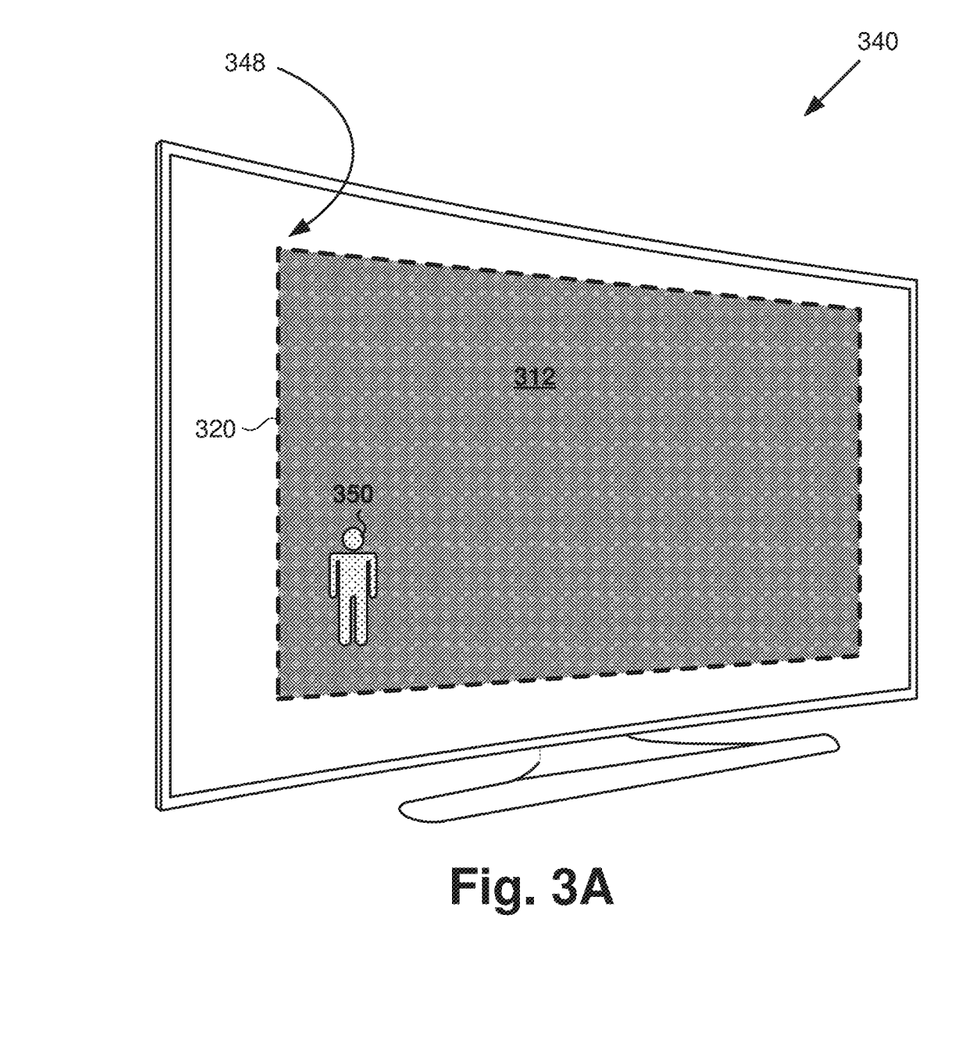
FIG. 3A shows an exemplary implementation in which a performance of a sign language translation of content is provided to viewers of that content.

FIG. 3A shows exemplary display 348 of user system 340 for use in providing sign language enhanced content 320. As shown in FIG. 3A, sign language enhanced content 320 includes content 312 and sign language translation 350 of content 312, shown as an overlay, of content 312 on display 348. User system 340, display 348, content 312, and sign language enhanced content 320 correspond respectively in general to user system(s) 140a-140c/240, display(s) 148a-148c/248, content 112/212, and sign language enhanced content 120/220 in FIGS. 1 and 2. As a result, user system 340, display 348, content 312, and sign language enhanced content 320 may share any of the characteristics attributed to respective user system(s) 140a-140c/240, display(s) 148a-148c/248, content 112/212, and sign language enhanced content 120/220 by the present disclosure, and vice versa. That is to say, like display(s) 148a-148c/248, display 348 may take the form of an LCD, LED display, OLE display, QD display, or any other suitable display screen that performs a physical transformation of signals to light. In addition, although not shown in FIG. 3A, user system 340 may include features corresponding respectively to user system computing platform 242, transceiver 243, processing hardware 244, and system memory 246 storing software code 208, in FIG. 2.

It is noted that although sign language translation 350 of content 312, is shown as an overlay of content 312, in FIG. 3A, that representation is merely exemplary. In other implementations, the display dimensions of content 312 may be reduced so as to allow sign language translation 350 of content 312 to be rendered next to content 312, e.g., above, below, or laterally adjacent to content 312. Alternatively, in some implementations, sign language translation 350 of content 312 may be projected or otherwise displayed on a surface other than display 348, such as a projection screen or wall behind or next to user system 340, 115 for example.

Sign language translation 350 of content 112/212/312 may be executed or performed (hereinafter "performed") by a computer generated digital character (hereinafter "digital character"), such as an animated cartoon or avatar for example. For instance, software code 108/208 may be configured to programmatically interpret one or more of visual images, audio, a script, captions, or subtitles, or metadata of content 112/212/312 into sign language hand signals, as well as other gestures, body language such as postures, and facial expressions communicating a message conveyed by content 112/212/312, and to perform that interpretation using the digital character. It is noted that background music with lyrics can be distinguished from lyrics being sung by a character using facial recognition, object recognition, activity recognition, or any combination of those technologies performed by software code 108/208, for example, using one or more machine learning model-based analyzers included in software code 108/208. It is further noted that software code 108/208 may be configured to predict appropriate facial expressions and body language for execution by the digital character during performance of sign language translation 350, as well as to predict the speed and forcefulness or emphasis with which the digital character executes the performance of sign language translation 350.

Referring to FIGS. 1 and 3A in combination, in some implementations, processing to hardware 104 of computing platform 102 may execute software code 108 to synchronize sign language translation 350 to a timecode of content 112/312, or to video frames or audio frames of content 112/212, when producing sign language enhanced content 120/320, and to record sign language enhanced content 120/320, or to broadcast or stream sign language enhanced content 120/320 to user system 140a-140c/340. In some of those implementations, the performance of sign language translation 350 by the digital character may be pre-rendered by system 100 and broadcasted or streamed to user system 140a-140c/340. However, in other implementations in which sign language enhanced content 120/320 including content 112/312 and sign language translation 350 are broadcasted or streamed to user system 140a-140c/340, processing hardware 104 may execute software code 108 to generate sign language translation 350 dynamically during the recording, broadcasting, or streaming of content 112/312.

Further referring to FIG. 2, in yet other implementations in which content 112/212/312 is broadcasted or streamed to user system 240/340, processing hardware 244 of user system 2401340 may execute software code 208 to generate sign language translation 350 locally on user system 240/340, and to do so dynamically during play out of content 112/212/312. Processing hardware 244 of user system 240/340 may further execute software code 208 to render the performance of sign language translation 350 by the digital character on display 248/348 concurrently with rendering content 112/317.

In some implementations, the pre-rendered performance of sign language translation 350 by a digital character, or facial points and other digital character landmarks for performing sign language translation 350 dynamically using the digital character may be transmitted to user system(s) 140a-140c/240/340 using a separate communication channel than that used to send and receive content 112/212/312. In one such implementation, the data for use in performing sign language translation 350 may be generated by software code 108 on system 100, and may be transmitted to user system(s) 140a-140c/240/340. In other implementations, the data for use in performing sign language translation 350 may be generated locally on user system 240/340 by software code 208, executed by processing hardware 244.

In some implementations, it may be advantageous or desirable to enable a user of user system(s) 140a-140c/240/340 to affirmatively select a particular digital character to perform sign language translation 350 from a predetermined cast of selectable digital characters. In those implementations, a child user could select an age appropriate digital character different from a digital character selected by an adult user. Alternatively, or in addition, the cast of selectable digital characters may vary depending on the subject matter of content 112/212/312. For instance, where content 112/212/312 portrays a sporting event, the selectable or default digital characters for performing sign language translation 350 may depict athletes, while actors or fictional characters may be depicted by sign language translation 350 when content 112/212/312 is a movie or episodic TV content.

Figure 3B:
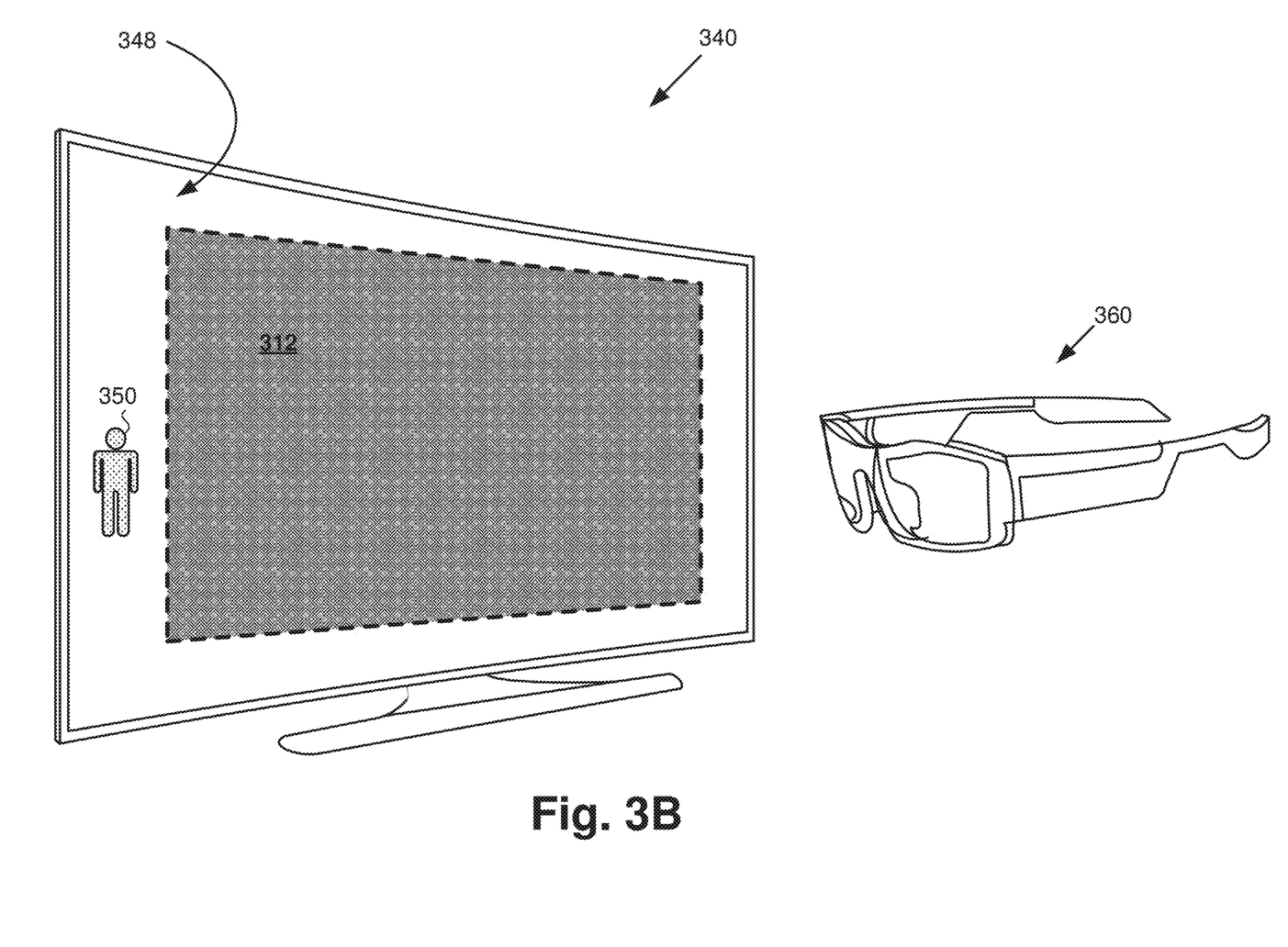
FIG. 3B shows an exemplary implementation in which a performance of a sign language translation of content is provided to one or more, but less than all viewers of the content.

According to the exemplary implementation shown in FIG. 3A, sign language translation 350 is rendered on display 348 of user system 340 and is thus visible to all viewers of content 312 concurrently. However, in some use cases it may be advantageous or desirable to make sign language translation 350 visible to one or more, but less than all of the viewers of user system 340. FIG. 3B shows such an implementation, according to one example. In addition to the features shown in FIG. 3A, FIG. 3B includes an augmented reality (AR) viewer in the form of AR glasses 360 for use by a user of user system 340. However, it is noted that more generally, AR glasses 360 may correspond to any AR viewing device. In the implementation shown in FIG. 3B, sign language translation 350 is rendered on AR glasses 360 as an overlay on content 312 rendered on display 348 (similar to the illustration in FIG. 3A), or outside of content 312, such as beside content 312 (as illustrated in FIG. 3B), for example.

In some implementations, the performance of sign language translation 350 by a digital character, or facial points and other digital character landmarks for performing sign language translation 350 dynamically using the digital character may be transmitted to AR glasses 360 using a separate communication channel than that used to send and receive content 312. In one such implementation, the data for use in performing sign language translation 350 may be generated by software code 108 on system 100, and may be transmitted to AR glasses 360 wirelessly, such as via a 4G or 5G wireless channel. In other implementations, the data for use in performing sign language translation 350 may be generated locally on user system 340 by software code 208, executed by processing hardware 244, and may be transmitted to AR glasses 360 via one or more of WiFi, Bluetooth, ZigBee, and 60 GHz wireless communications methods.

The implementation shown in FIG. 3B enables one or more users of user system 340 to receive sign language translation 350 while advantageously rendering sign language translation 350 undetectable to other users. Alternatively, or in addition, in implementations in which sign language translation 350 is performed by a digital character, the implementation shown in FIG. 3B advantageously may enable different users to select different digital characters to perform sign language translation 350. In some implementations, for example, a user of AR glasses 360 may select from among pre-rendered to performances of sign language translation 350 by different digital characters. In those implementations, the user selected performance may be transmitted to AR glasses 360 by system 100 or user system 340. Alternatively, in some implementations, system 100 or user system 340 may render a user selected performance dynamically and in real-time with respect to playout of content 312, and may output that render to AR glasses 360. In yet other implementations, AR glasses 360 may be configured to render the performance of sign language translation 350 dynamically, using facial points and other digital character landmarks for animating sign language translation 350 received from system 100 or user system 340.

Figure 3C:
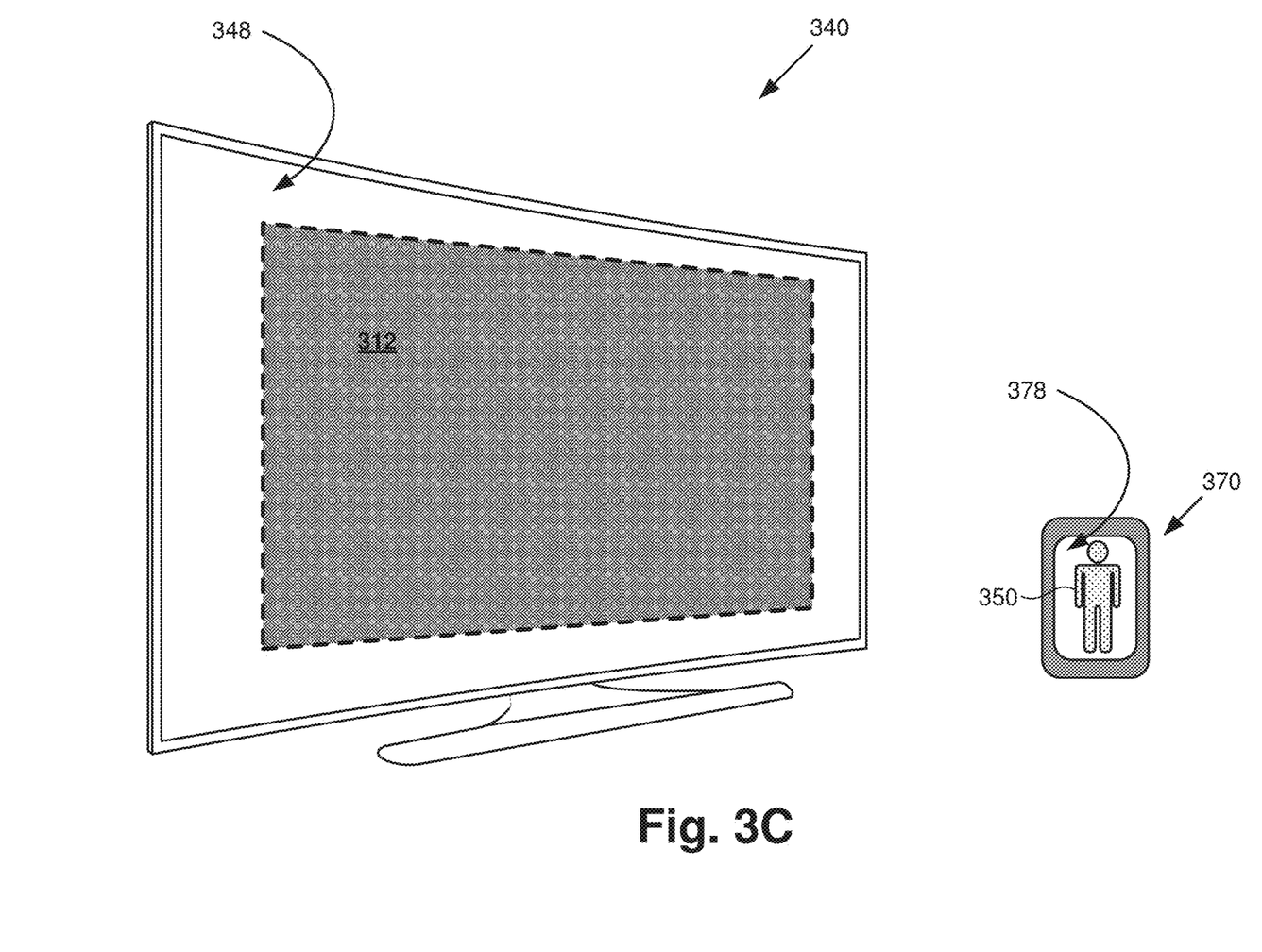
FIG. 3C shows another exemplary implementation in which a performance of a sign language translation of content is provided to one or more, but less than all viewers of the content.

FIG. 3C shows another exemplary implementation in which sign language translation 350 is visible to one or more, but less than all of the viewers of user system 340. In addition to the features shown in FIG. 3A, FIG. 3C includes personal communication device 370 including display 378 providing a second display screen for use by a viewer of user system 340. In the implementation shown in FIG. 3C, sign language translation 350 is rendered on display 378 of personal communication device 370 and is synchronized with playout of content 312 on display 348 of user system 340. Synchronization of sign language translation 350 with playout of content 312 may be performed periodically, using predetermined time intervals between synchronizations, or may be performed substantially continuously.

Personal communication device 370 may take the form of a smartphone, tablet computer, game console, smartwatch, or other wearable or otherwise smart device, to name a few examples. Display 378 providing the second display screen for a user of user system 340 may be implemented as an LCD, LED display, OED, display, QD display, or any other suitable display screen that performs a physical transformation of signals to light.

In some implementations, facial points and other digital character landmarks for performing sign language translation 350 dynamically using the digital character may be transmitted to personal communication device 370 using a separate communication channel than that used to send and receive content 312. In one such implementation, the data for use in performing sign language translation 350 may be generated by software code 108 on system 100, and may be transmitted to personal communication device 370 wirelessly, such as via a 4G or 5G wireless channel. In other implementations, the data for use in performing sign language translation 350 may be generated locally on user system 340 by software code 208, executed by processing hardware 244, and may be transmitted to personal communication device 370 via one or more of WiFi, Bluetooth, ZigBee, and 60 GHz wireless communications methods.

As in FIG. 3B, the implementation shown in FIG. 3C enables one or more viewers of user system 340 to receive sign language translation 350 while advantageously rendering sign language translation 350 undetectable to other viewers. Alternatively, or in addition, in implementations in which sign language translation 350 is performed by a digital Character, the implementation shown in FIG. 3C advantageously may enable different viewers of content 312 to select different digital characters to perform sign language translation 350. In some implementations, for example, a user of personal communication device 370 may select from among pre-rendered performances of sign language translation 50 by different digital characters. In those implementations, the user selected performance may be transmitted to personal communication device 370 by system 100 or user system 340. Alternatively, in some implementations, system 100 or user system 340 may render a user selected performance dynamically and in real-time with respect to playout of content 312, and may output that render to personal communication device 370. In yet other implementations, personal communication device 370 may be configured to render the performance of sign language translation 350 dynamically, using facial points and other digital character landmarks for performing sign language translation 350 received from system 100 or user system 340.

Figure 3D:
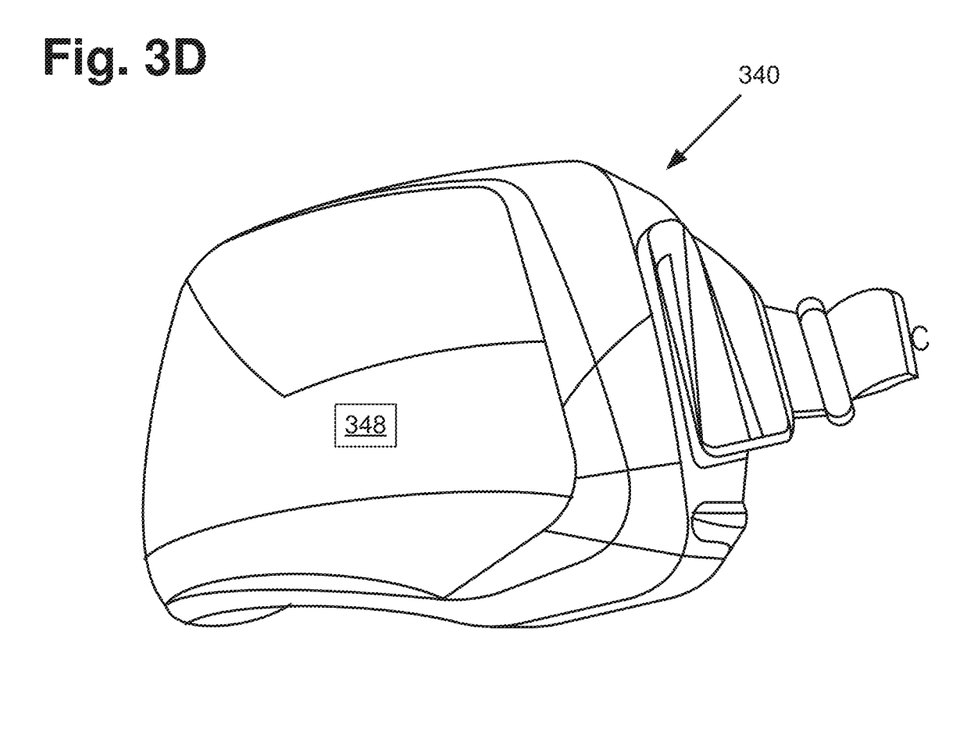
FIG. 3D shows another exemplary system for providing sign language enhanced content.

FIG. 3D shows an implementation of user system 340 in the form of a VR headset including display 348. In various implementations, facial points and other digital character landmarks for performing sign language translation 350 dynamically using a digital character may be transmitted to the VR headset using a separate communication channel than that used to send and receive content 312. In one such implementation, the data for use in performing sign language translation 350 may be generated by software code 108 on system 100, and may be transmitted to the VR headset wirelessly, such as via a 4G or 5G wireless channel. In other implementations, the data for use in performing sign language translation 350 may be generated locally on user system 340 in the form of a VR headset, by software code 208, executed by processing hardware 244 and may be rendered on display 348 of the VR headset.

In implementations in which sign language translation 350 is performed by a digital character, the implementation shown in FIG. 3D advantageously may enable different viewers of content 312 to select different digital characters to perform sign language translation 350. In some implementations, for example, a user of the VR headset may select from among pre-rendered performances of sign language translation 350 by different digital characters. In those implementations, the user selected performance may be transmitted to the VR headset by system 100.

In addition to the exemplary implementations shown in FIGS. 1, 2, 3A, 3B, 3C, and 3D, in some implementations, sign language translation 350 may be rendered for some or all users of user system 140*a*-140*c*/240/340 using a lenticular projection technique in which dual video feeds are generated, one presenting content 112/212/312 and the other presenting sign language translation 350. In some implementations employing such a lenticular technique, sign language translation 350 may be visible to all users of user system 140*a*-140*c*/240/340, while in other implementations, customized eyewear could be used to render sign language translation 350 visible only to those users utilizing the customized eyewear.

Figure 4:
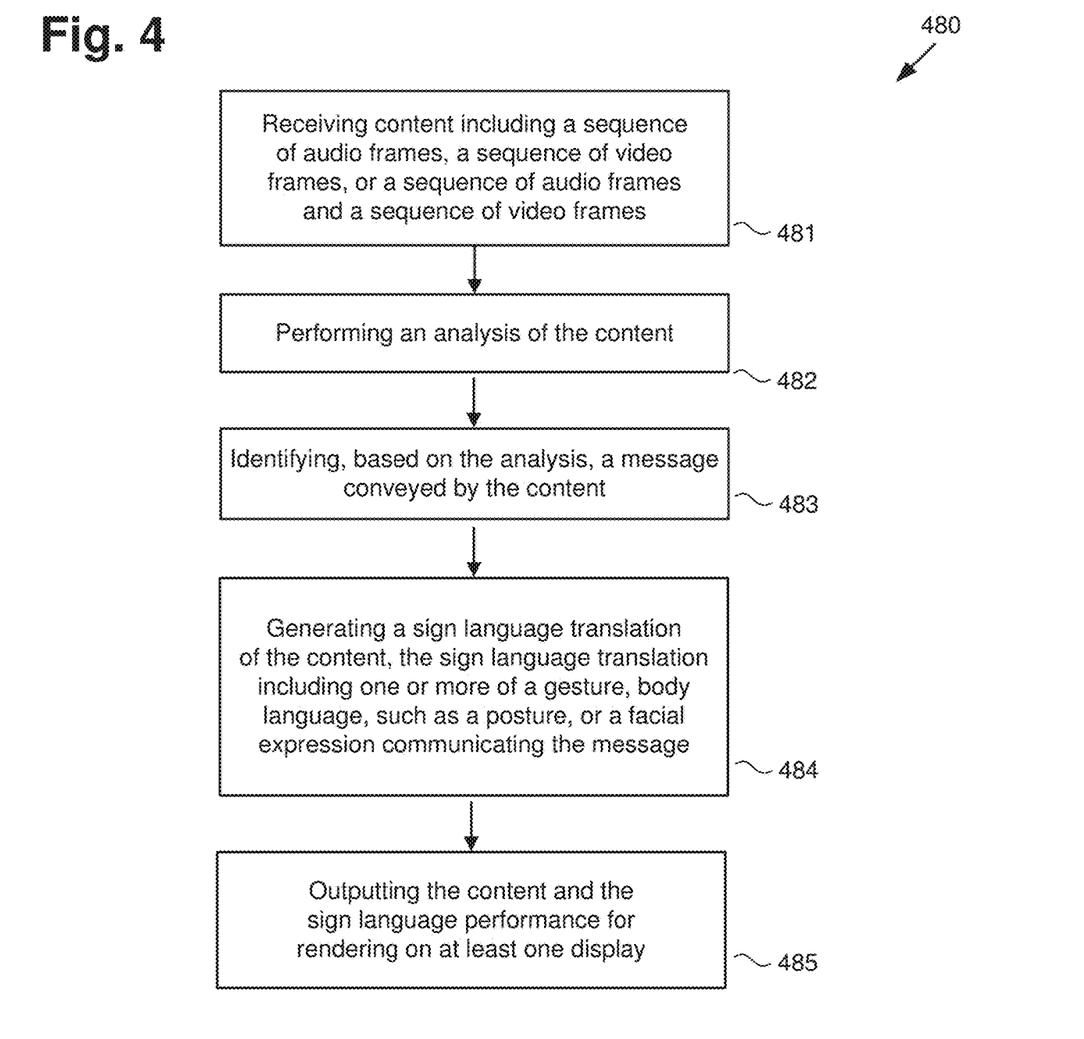
FIG. 4 shows a flowchart outlining an exemplary method for distributing sign language enhanced content, according to one implementation.

The functionality of system 100, user system(s) 140*a*-140*c*/240/340, and software code 108/208 shown variously in FIGS. 1, 2, 3A, 3B, 3C, and 3D will be further described by reference to FIG. 4. FIG. 4 shows flowchart 480 presenting an exemplary method for providing feelings-based or emotion-based sign language enhancement of content, according to one implementation. With respect to the method outlined in FIG. 4, it is noted that certain details and features have been left out of flowchart 480 in order not to obscure the discussion of the inventive features in the present application.

Referring to FIG. 4 in combination with FIGS. 1 and 2 flowchart 48C begins with receiving content 112/212 including a sequence of audio frames, a sequence of video frames, or a sequence of audio frames and a sequence of video frames (action 481). It is noted that, in addition to one or both of a sequence of video frames and a sequence of audio frames, in some use cases content 112/212 may include one or more of subtitles, or an original script or shooting script for content 112/212, as those terms are known in the art.

Furthermore, and as noted above, content 112/212 may include content in the form of video games, music videos, animation, movies, or episodic TV content that includes episodes of TV shows that are broadcasted, streamed, or otherwise available for download or purchase on the Internet or via a user application. Alternatively, or in addition, content 112/212 may be or include digital representations of persons, fictional characters, locations, objects, and identifiers such as brands and logos, for example, which populate a VR, AR, or MR environment. Moreover, in some implementations, content 112/212 may depict virtual worlds that can be experienced by any number of users synchronously and persistently, while providing continuity of data such as personal identity, user history, entitlements, possessions, payments, and the like. As also noted above, content 112/212 may be or include content that is a hybrid of traditional audio-video and fully immersive VR/AR/MR experiences, such as interactive video.

As shown in FIG. 1, in some implementations, content 112 may be received by system 100 from broadcast source 110. In those implementations, content 112 may be received by software code 108, executed by processing hardware 104 of computing platform 102. As shown in FIG. 2, in other implementations, content 212 may be received by user system 240 from content distribution network 214 via communication network 230 and network communication links 232. Referring to FIG. 2, in those implementations, content 212 may be received by software code 208, executed by processing hardware 244 of user system computing platform 242.

Flowchart 480 further includes performing an analysis of content 112/212 (action 482). For example, processing hardware 104 may execute software code 108, or processing hardware 244 may execute software code 208 to utilize a visual analyzer included as a feature of software code 108/208, an audio analyzer included as a feature of software code 108/208, or such a visual analyzer and audio analyzer, to perform the analysis of content 112/212.

In various implementations, a visual analyzer included as a feature of software code 108/208 may be configured to apply computer vision or other AI techniques to content 112/212, or may be implemented as a NN or other type of machine learning model. Such a visual analyzer may be configured or trained to recognize what characters are speaking, well as the intensity of their delivery. In particular, such a visual analyzer may be configured or trained to identify humans, characters, or other talking animated objects, and identify emotions or intensity of messaging. In various use cases, different implementations of such a visual analyzer may be used for different types of content (i.e., a specific configuration or training for specific content). For example, for a news broadcast, the visual analyzer may be configured or trained to identify specific TV anchors and their characteristics, or salient regions of frames within video content for the visual analyzer to focus on may be specified, such as regions in which the TV anchor usually is seated.

An audio analyzer included as a feature of software code 108/208 may also be implemented as a NN or other machine learning model. As noted above, in some implementations, a visual analyzer and an audio analyzer may be used in combination to analyze content 112/212. For instance, in analyzing a football game or other sporting event, the audio analyzer can be configured or trained to listen to the audio track of the event, and its analysis may be verified using the visual analyzer or the visual analyzer may interpret the video of the event, and its analysis may be verified using the audio analyzer. It is noted that content 112/212 will typically include multiple video frames and multiple audio frames. In some of those use cases, processing hardware 104 may execute software code 108, or to processing hardware 244 may execute software code 208 to perform the visual analysis of content 112/212, the audio analysis of content 112/212, or both the visual analysis and the audio analysis, on a frame-by-frame basis.

Flowchart 480 further includes identifying, based on the analysis performed in action 482, a message conveyed by content 112/212 (action 483). Identification of the message conveyed by content 112/212 may be performed by software code 108 executed by processing hardware 104, or by software code 208 executed by processing hardware 244. For example, software code 108/208 may be configured to aggregate data resulting from the analysis performed in action 482, and infer, based on that, aggregated data, the message being conveyed by content 112/212.

In some use cases, content 112/212 may include text. In use cases in which content 112/212 includes text, processing hardware 104 may further execute software code 108, or processing hardware 244 may further execute software code 208 to utilize a text analyzer included as a feature of software code 108/208 to analyze content 112/212. Thus, in use cases in which content 112/212 includes text, the identification of the message conveyed by content 112/212 performed in action 483 may further be based on analyzing that text.

It is further noted that, in some use cases, content 112/212 may include metadata. In use cases in which content 112/212 includes metadata, processing hardware 104 may execute software code 108, or processing hardware 244 may further execute software code 208 to utilize a metadata parser included as a feature of software code 108/208 to extract metadata from content 112/212. Thus, in use cases in which content 112l212 includes metadata, the identification of the message conveyed by content 112/212 performed in action 483 may further be based on extracting and analyzing that metadata.

Referring to FIG. 4 with further reference to FIGS. 3A, 39, and 3C, flowchart 480 further includes generating sign language translation 350 of content 112/212, where sign language translation 350 includes one or more of a gesture, body language such as a posture, or a facial expression communicating the message conveyed by content 112/212/312. (action 484). Action 484 may be performed by software code 108 executed by processing hardware 104 of system 100, or by software code 208 executed by processing hardware 244 of user system 240.

In some implementations, flowchart 480 may conclude with action 484 described above. However, in other implementations, flowchart 480 may further include outputting content 112/212/312 and sign language performance 350 for rendering on one or more displays (action 485). Action 485 may be performed by software code 108 executed by processing hardware 104 of system 100, or by software code 208 executed by processing hardware 244 of user system 240/340.

As discussed above by reference to FIGS. 1, 3A, and 3D in some implementations, processing hardware 104 of system 100 may executed software code 108 to synchronize sign language translation 350 to a timecode of content 112/212/312, or to video frames or audio frames of content 11/212/312, to produce sign language enhanced content 120/320, and to broadcast or stream sign language enhanced content 120/320 including synchronized sign language performance 350 to user system 140a-140c/340. In some of those implementations, the performance of sign language translation 350 by the digital character may be pre-rendered by system 100 and broadcasted or streamed to user system 140a-140c/340. However, in other implementations in which content 112/312 and sign language translation 350 are broadcasted or streamed to user system 140a-1.40c/340, processing hardware 104 may execute software code 108 to generate sign language translation 350 dynamically during the recording, broadcasting, or streaming of content 112/312.

Further referring to FIG. 2, in yet other implementations in which content 212/312 is broadcasted or streamed to user system 240/340, processing hardware 244 of user system 240/340 may execute software code 208 to generate sign language translation 350 locally on user system 240/340, and to do so dynamically during playout of content 112/212/312. Processing hardware 244 of user system 240/340 may further execute software code 208 to render the performance of sign language translation 350 by the digital character on display 248/348 concurrently with rendering content 212/312 corresponding to sign language translation 350.

Furthermore, in some implementations, processing hardware 204 of user system 240/340 may execute software code 208 to render content 212/312 on display 348 of user system 340, and to transmit, concurrently with rendering content 112/212 on display 348, sign language translation 350 to a client device. For example, and as further shown by FIGS. 3B and 3C, processing hardware 204 of user system 240/340 may execute software code 208 to render content 212/312 on display 348 of user system 340, and to transmit, concurrently with rendering content 112/212 on display 348, sign language translation 350 for rendering on AR glasses 360 or display 378 of personal communication device 370.

With respect to the method outlined by flowchart 480, it is noted that actions 481, 482, 483, and 484 or actions 481, 482, 483, 484, and 485 may be performed in an automated process from which human participation play be omitted.

Thus, the present application discloses systems and methods for distributing sign language enhanced content. From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many, rearrangements, modifications, and substitutions are possible without departing from the scope of the present disclosure.

What is claimed is:

1. A system comprising:
   a computing platform including a processing hardware and a system memory storing a software code;
   the processing hardware configured to execute the software code to:
   receive content including at least one of a sequence of audio frames or a sequence of video frames;
   perform an analysis of the content;
   identify, based on the analysis, a message conveyed by the content;
   generate a sign language translation of the content, the sign language translation including one or more of a gesture, body language, or a facial expression communicating the message;
   broadcast or stream the sign language translation, over a first communication channel, to a remote client system for rendering on a first display of the remote client system; and
   concurrently with broadcasting or streaming the sign language translation, broadcast or stream the content, over a second communication channel separate from the first communication channel, to the remote client system for rendering on a second display of the remote client system.

2. The system of claim 1, wherein the content is rendered on the second display, concurrently with rendering a performance of the sign language translation on the first display.

3. The system of claim 1, wherein a performance of the sign language translation is rendered using a digital character.

4. The system of claim 1, wherein a performance of the sign language translation is rendered on the first display such that the sign language translation is visible to at least one, but not all of a plurality of users concurrently viewing the content on the first display.

5. The system of claim 1, wherein the remote client system comprises an augmented reality (AR) viewer.

6. The system of claim 1, wherein the content comprises digital representations that populate a virtual reality, augmented reality, or mixed reality environment.

7. The system of claim 1, wherein the processing hardware is further configured to execute the software code to:

synchronize the sign language translation to one of a timecode of the content, the sequence of audio frames, or the sequence of video frames.

8. The system of claim 1, wherein the processing hardware is further configured to execute the software code to:
generate the sign language translation dynamically during the broadcasting or the streaming of the content.

9. A method comprising:
receiving content including at least one of a sequence of audio frames or a sequence of video frames;
performing an analysis of the content;
identifying, based on the analysis, a message conveyed by the content;
generating a sign language translation of the content, the sign language translation including one or more of a gesture, body language, or a facial expression communicating the message;
broadcasting or streaming the sign language translation, over a first communication channel, to a remote client system for rendering on a first display of the remote client system; and
concurrently with broadcasting or streaming the sign language translation, broadcasting or streaming the content, over a second communication channel separate from the first communication channel, to the remote client system for rendering on a second display of the remote client system.

10. The method of claim 9, further comprising:
rendering, concurrently with rendering the content on the second display, a performance of the sign language translation on the first display.

11. The method of claim 9, wherein a performance of the sign language translation is rendered using a digital character.

12. The method of claim 9, wherein the sign language translation is rendered on the first display such that the sign language translation is visible to at least one, but not all of a plurality of users concurrently viewing the content on the first display.

13. The method of claim 9, wherein the remote client system comprises an augmented reality (AR) viewer.

14. The method of claim 9, further comprising:
before rendering a performance of the sign language translation on the first display, synchronizing the sign language translation to one of a timecode of the content, the sequence of audio frames, or the sequence of video frames.

15. The method of claim 9, wherein the content comprises digital representations that populate a virtual reality, augmented reality, or mixed reality environment.

16. The method of claim 9, further comprising:
generating the sign language translation dynamically during the broadcasting or the streaming of the content.

* * * * *